(12) United States Patent
Matsui et al.

(10) Patent No.: US 9,573,586 B2
(45) Date of Patent: Feb. 21, 2017

(54) HYBRID VEHICLE CONTROL DEVICE

(71) Applicant: Nissan Motor Co., Ltd., Yokohama-shi, Kanagawa (JP)

(72) Inventors: Hiroki Matsui, Ebina (JP); Fumuhiro Yamanaka, Hiratsuka (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 14/781,420

(22) PCT Filed: Mar. 13, 2014

(86) PCT No.: PCT/JP2014/056755
§ 371 (c)(1),
(2) Date: Sep. 30, 2015

(87) PCT Pub. No.: WO2014/162839
PCT Pub. Date: Oct. 9, 2014

(65) Prior Publication Data
US 2016/0031438 A1   Feb. 4, 2016

(30) Foreign Application Priority Data

Apr. 4, 2013   (JP) ................................ 2013-078696

(51) Int. Cl.
*B60W 20/00*  (2016.01)
*B60K 6/442*  (2007.10)
(Continued)

(52) U.S. Cl.
CPC .............. *B60W 20/40* (2013.01); *B60K 6/442* (2013.01); *B60K 6/48* (2013.01); *B60K 6/547* (2013.01);
(Continued)

(58) Field of Classification Search
CPC .......... G60K 6/48; G60K 6/547; G60K 6/442; B60L 11/14; B60L 15/2045; B60L 15/2054; B60L 2220/14; B60L 2240/421; B60L 2240/423; B60L 2240/441; B60L 2240/443; B60L 2240/486; B60L 2240/507; B60L 2260/26; B60L 2520/10; B60L 2510/244; F02D 29/02; Y02T 10/72; Y02T 10/7077; Y02T 10/7283; Y02T 10/70; Y02T 10/6221; Y02T 10/645; Y10S 903/919
(Continued)

(56) References Cited

U.S. PATENT DOCUMENTS

2011/0077810 A1*   3/2011   Katou ................. B60W 10/108
701/22

FOREIGN PATENT DOCUMENTS

JP          2008-179242 A      8/2008
JP          2010-23660 A       2/2010
(Continued)

*Primary Examiner* — Marthe Marc-Coleman
(74) *Attorney, Agent, or Firm* — Global IP Counselors, LLP

(57) ABSTRACT

A hybrid vehicle control device is provided with an engine, a motor, a mode switching mechanism and an engine start control unit. The motor is disposed in a drive system between the engine and a driving wheel for starting the engine and driving the driving wheel. The mode switching mechanism is operatively coupled to a connecting portion of the engine and the motor. The motor starts the engine upon an engine start request being outputted while traveling with only the motor as a drive source. The engine start control unit makes starting the engine more difficult, upon determining vehicle speed is increasing while a depression operation of an accelerator is occurring, until the rotational speed of the motor decreases, by performing an upshift operation (Continued)

that reduces a gear ratio by making a starting condition of the engine stricter as compared to a gear ratio prior to the upshift operation.

16 Claims, 7 Drawing Sheets

(51) Int. Cl.
    *B60K 6/547*      (2007.10)
    *B60W 10/06*      (2006.01)
    *B60W 10/11*      (2012.01)
    *B60W 30/188*      (2012.01)
    *B60K 6/48*      (2007.10)
    *B60L 11/14*      (2006.01)
    *F02D 29/02*      (2006.01)
    *B60L 15/20*      (2006.01)

(52) U.S. Cl.
    CPC .......... *B60L 11/14* (2013.01); *B60L 15/2045* (2013.01); *B60L 15/2054* (2013.01); *B60W 10/06* (2013.01); *B60W 10/11* (2013.01); *B60W 30/1882* (2013.01); *F02D 29/02* (2013.01); *B60L 2220/14* (2013.01); *B60L 2240/421* (2013.01); *B60L 2240/423* (2013.01); *B60L 2240/441* (2013.01); *B60L 2240/443* (2013.01); *B60L 2240/486* (2013.01); *B60L 2240/507* (2013.01); *B60L 2260/26* (2013.01); *B60W 2510/081* (2013.01); *B60W 2510/244* (2013.01); *B60W 2520/10* (2013.01); *B60W 2540/103* (2013.01); *B60W 2710/06* (2013.01); *B60W 2710/1005* (2013.01); *Y02T 10/6221* (2013.01); *Y02T 10/645* (2013.01); *Y02T 10/70* (2013.01); *Y02T 10/7077* (2013.01); *Y02T 10/72* (2013.01); *Y02T 10/7283* (2013.01); *Y10S 903/919* (2013.01); *Y10S 903/93* (2013.01)

(58) Field of Classification Search
    USPC ............... 701/22; 180/65.23, 65.265, 65.28; 290/38 R, 40 A, 40 B; 903/919, 930; 475/5
    See application file for complete search history.

(56) References Cited

FOREIGN PATENT DOCUMENTS

| | | |
|---|---|---|
| JP | 2010-201962 A | 9/2010 |
| JP | 2010-228672 A | 10/2010 |
| JP | 2012-176713 A | 9/2012 |
| JP | 2013-35336 A | 2/2013 |

\* cited by examiner

| | B1 Fr/B | C1 I/C | C2 D/C | C3 H&LR/C | B2 LOW/B | B3 2346/B | B4 R/B | F1 1st OWC | F2 1&2 OWC |
|---|---|---|---|---|---|---|---|---|---|
| 1st | (O) | | | (O) | O | | | O | O |
| 2nd | | | | (O) | O | O | | | O |
| 3rd | | | O | | O | O | | | |
| 4th | | | O | O | | O | | | |
| 5th | | O | O | O | | | | | |
| 6th | | O | | O | | O | | | |
| 7th | O | O | | O | | | | O | |
| Rev. | O | | | O | | | O | | |

HYBRID VEHICLE CONTROL DEVICE

CROSS-REFERENCE TO RELATED APPLICATIONS

This application is a U.S. National stage application of International Application No. PCT/JP2014/056755, filed Mar. 13, 2014, which claims priority to Japanese Patent Application No. 2013-078696 filed in Japan on Apr. 4, 2013. The entire disclosure of Japanese Patent Application No. 2013-078696 is incorporated herein by reference.

BACKGROUND

Field of the Invention

The present invention relates to an hybrid vehicle control device having a motor starts an engine start that drives a driving wheel when an engine start request has been made.

Background Information

Conventionally, a hybrid vehicle that has an engine that is driven by fuel and a motor that is driven by power that is stored in a battery as travel drive sources comprises a first clutch configured to divide the power transmission between the engine and the motor.
A hybrid vehicle control device that is mounted on this type of hybrid vehicle, in which, when traveling with only a motor as the drive source with the first clutch released when there is an engine start request, the first clutch is engaged, and the engine is started with the motor as a starter motor, is known (for example, refer to Japanese Laid-Open Patent Application No. 2008-179242). When starting the engine with the motor as the starter motor, the cranking is completed when the motor rotational speed and the engine rotational speed match and the differential rotation of the first clutch is eliminated.

SUMMARY

In a hybrid vehicle control device, an engine start map is set in advance in accordance with, for example, the required driving force of the driver and the battery SOC, and the engine start request is outputted based on the position of the value that is determined from the required driving force and the battery SOC on this engine start map. In a conventional hybrid vehicle control device, an engine start request is outputted based on an engine start map, the required driving force, and the battery SOC, regardless of the rotational speed of the motor as the starter motor. Accordingly, if the motor rotational speed when the engine start request is outputted is relatively high, cranking cannot be performed unless the engine rotational speed is also a high-speed rotation. Consequently, there is the problem that the engine fuel consumption becomes poor.

In view of the problem described above, an object of the present invention is to provide a hybrid vehicle control device that is able to prevent a deterioration of fuel consumption caused by starting an engine.

In order to achieve the object above, the hybrid vehicle control device of the present invention is mounted on a hybrid vehicle comprising an engine; a motor provided to a drive system from the engine to the driving wheels to start the engine and drive the driving wheels; and a mode switching mechanism provided to a connecting portion of the engine and the motor, which starts the engine by transmitting the torque of the motor to the engine when there is an engine start request while traveling with only the motor as the drive source. The hybrid vehicle control device further comprises an engine start control unit configured to make starting the engine more difficult when the vehicle speed increases accompanying a depression operation of an accelerator, until a decrease in the rotational speed of the motor is generated by an upshift that reduces the gear ratio by making a starting condition of the engine stricter.

In the present invention, an engine start request being generated when the motor rotational speed is relatively high can thereby be suppressed, and the generation of a situation in which the engine rotational speed increases when starting the engine can be avoided. As a result, the deterioration of fuel consumption due to starting an engine can be prevented.

BRIEF DESCRIPTION OF THE DRAWINGS

Referring now to the attached drawings which form a part of this original disclosure.

DETAILED DESCRIPTION OF THE EMBODIMENTS

Figure 1:
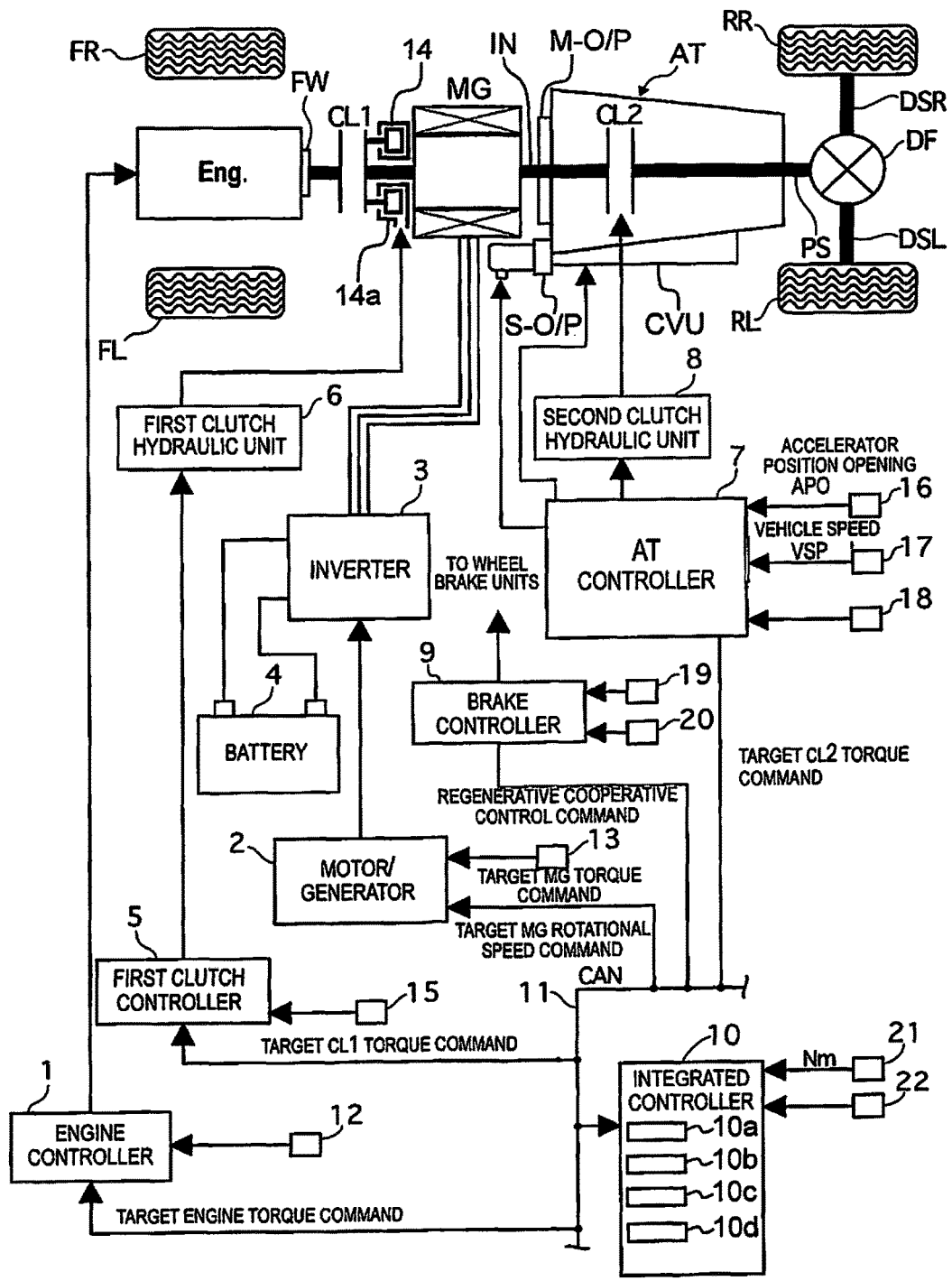
FIG. 1 is an overall system diagram illustrating a rear-wheel-drive FR hybrid vehicle (one example of a hybrid vehicle) to which is applied the control device of the first embodiment.

An embodiment for realizing the hybrid vehicle control device of the present invention is explained below based on the first embodiment illustrated in the drawings.

First Embodiment

The overall configuration of a rear-wheel-drive FR hybrid vehicle is described first with reference to FIG. 1. The "overall system configuration," the "schematic configuration of the automatic transmission," and the "configuration of the engine start determination process" will be separately described regarding the configuration of the electric-powered vehicle control device in the first embodiment.

Overall System Configuration

Figure 2:
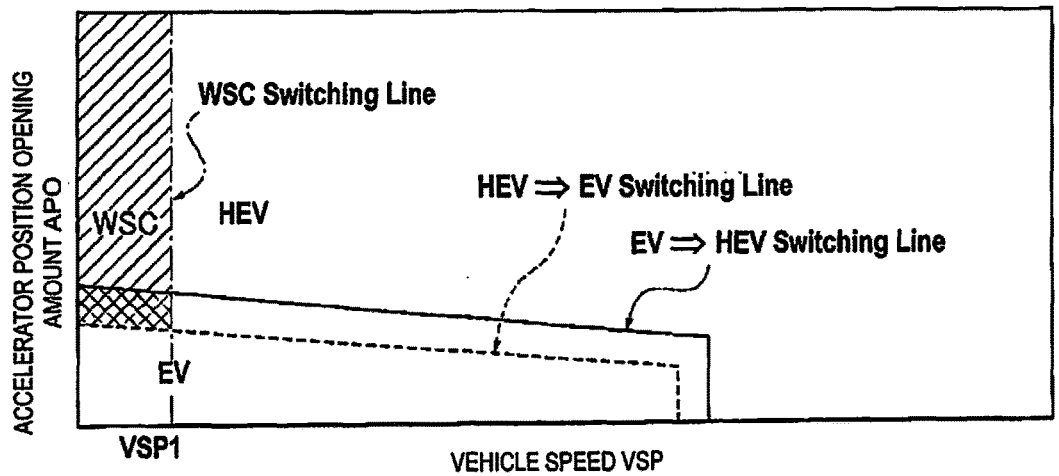
FIG. 2 is a diagram illustrating one example of an EV-HEV selection map that is set in the mode selection unit of the integrated controller of the first embodiment.

FIG. 1 illustrates a rear-wheel-drive FR hybrid vehicle (one example of a hybrid vehicle) to which is applied the control device of the first embodiment; FIG. 2 illustrates one example of an EV-HEV selection map that is set in a mode selection unit of an integrated controller. The overall system configuration will be described below based on FIG. 1 and FIG. 2.

The drive system of an FR hybrid vehicle comprises an engine Eng, a first clutch CL1 (mode switching mechanism), a motor/generator MG (motor), a second clutch CL2, an automatic transmission (transmission) AT, a transmission input shaft IN, a propeller shaft PS, a differential DF, a left drive shaft DSL, a right drive shaft DSR, a left rear wheel RL (driving wheel), and a right rear wheel RR (driving wheel), as illustrated in FIG. 1. M-O/P is a mechanical oil pump, S-O/P is an electric oil pump, FL is a left front wheel, FR is a right front wheel, and FW is a flywheel.

The engine Eng is a gasoline engine or a diesel engine that becomes the travel drive source, in which an engine start control, an engine stop control, and a valve opening control of the throttle valve are performed based on an engine control command from an engine controller 1. A flywheel FW is provided to the engine output shaft.

The motor/generator MG is a synchronous motor/generator, in which a permanent magnet is embedded in the rotor and a stator coil is wound on the stator, which becomes a travel drive source. This motor/generator MG is controlled by applying a three-phase AC current that is produced by an inverter 3, based on a control command from the motor controller 2. This motor/generator MG may be operated as an electric motor that is rotationally driven by receiving a power supply from a battery 4 (this state is hereinafter referred to as "powering"); or, this may function as an electric generator that generates electromotive force at both ends of the stator coil and charges the battery 4 when the rotor receives rotational energy from the engine Eng or the driving wheels (this operating state is hereinafter referred to as "regeneration"). Additionally, when the first clutch CL1 is engaged, the motor/generator becomes a starter motor that starts the engine Eng. The rotor of this motor/generator MG is connected to the transmission input shaft IN of the automatic transmission AT via a damper.

The first clutch CL1 is an engagement element that is provided between the engine Eng and the motor/generator MG. This first clutch CL1 is a so-called normally closed type clutch that is put in an engaged state by a biasing force of a diaphragm spring, etc., when CL1 hydraulic pressure is not applied, and that is released by applying CL1 hydraulic pressure that counteracts this biasing force. This first clutch CL1 is engaged when there is an engine start request, and the torque of the motor/generator MG is transmitted to the engine Eng to start the engine.

The automatic transmission AT is a stepped transmission in which the gear stages of forward seven gears/reverse one gear are automatically switched in accordance with the vehicle speed, accelerator opening, or the like. The output shaft of the automatic transmission AT is connected to the left and right rear wheels RL, RR via the propeller shaft PS, the differential DF, the left drive shaft DSL, and the right drive shaft DSR.

The second clutch CL2 is a frictional engagement element that is disposed in a power transmission path from the motor/generator MG to the left and right rear wheels RL, RR. Here, a frictional engagement element (clutch or brake) for shifting the automatic transmission AT is used as the second clutch CL2, rather than using a newly added one as a dedicated clutch that is independent of the automatic transmission AT. That is, of the frictional engagement elements that are engaged at each gear stage of the automatic transmission AT, the frictional engagement element that is selected as an element that conforms to the engagement conditions, and etc., is configured to be the second clutch CL2. The first clutch hydraulic unit 6 and the second clutch hydraulic unit 8 are incorporated in an AT hydraulic control valve unit CVU that is provided to the automatic transmission AT.

This FR hybrid vehicle comprises a hybrid vehicle mode (hereinafter referred to as "EV mode"), a hybrid vehicle mode (hereinafter referred to as "HEV mode"), and a drive torque control mode (hereinafter referred to as "WSC mode"), as modes according to differences in the driving mode.

The "EV mode" is a mode in which the first clutch CL1 is released and in which the motor/generator MG is the only drive source, comprising a motor drive mode (motor powering) and a generator generation mode (generator regeneration). This "EV mode" is selected when, for example, the required driving force is low and a battery SOC is secured.

The "HEV mode" is a mode in which the first clutch CL1 is put in an engaged state and in which the engine Eng and the motor/generator MG are configured as the drive source. The "HEV mode" comprises a motor assist mode (motor powering), an engine generation mode (generator regeneration), and a regenerative deceleration generation mode (generator regeneration). This "HEV mode" is selected when, for example, the required driving force is high or when a battery SOC is lacking.

The "WSC mode" is a mode in which the driving mode is the "HEV mode," but the torque transmission capacity of the second clutch CL2 is controlled while maintaining the second clutch CL2 in a slip-engaged state, by controlling the rotational speed of the motor/generator MG. The torque transmission capacity of the second clutch CL2 is controlled so that the driving force that is transmitted via the second clutch CL2 will be the required driving force that is represented by the accelerator-operation amount of the driver. This "WSC mode" is selected when the engine rotational speed is in a region that falls below the idling rotational speed, as when starting when the "HEV mode" is selected.

The control system of the FR hybrid vehicle is configured to comprise an engine controller 1, a motor controller 2, an inverter 3, a battery 4, a first clutch controller 5, a first clutch hydraulic unit 6, an AT controller 7, a second clutch hydraulic unit 8, a brake controller 9, and an integrated controller 10, as illustrated in FIG. 1.

Each of the controllers 1, 2, 5, 7, and 9 described above and the integrated controller 10 are connected via a CAN communication line 11 that allows information exchange with each other. 12 is an engine rotational speed sensor, 13 is a resolver, 15 is a first clutch stroke sensor that detects the stroke position of a piston 14a of a hydraulic actuator 14, 19 is a wheel speed sensor, and 20 is a brake stroke sensor.

The AT controller 7 inputs information from the acceleration opening amount sensor 16, the vehicle speed sensor 17, an inhibitor switch 18 that detects the selected range position (N range, D range, R range, P range, etc.), and the like. Then, when traveling while selecting the D range, the optimum gear stage is searched from the positions in which the operating point determined from the accelerator position opening amount APO and the vehicle speed VSP exists on the shifting map (refer to FIG. 5), and a control command for obtaining the searched gear stage is output to the AT hydraulic control valve unit CVU. In addition to this shift control, control of full engagement (HEV mode)/slip-engagement (engine start)/release (EV mode) of the first clutch CL1 is executed, based on a command from the integrated controller 10. Also, the control of full engagement (HEV mode)/μ slip-engagement (EV mode)/rotational difference absorption slip-engagement (WSC mode)/variable torque blocking slip-engagement (engine start/stop mode) of the second clutch CL2 is executed.

Here, when traveling in the EV mode with the automatic transmission AT in a non-shifting state, a control to maintain the micro-slip rotation (μ slip rotation) of the second clutch CL2 is referred to as the "μ slip control." This "μ slip control" is executed by a motor rotational speed control that controls the actual motor rotational speed of the motor/generator MG to make this match a target motor rotational speed in which the second clutch CL2 is in a micro-slip rotation. The motor torque during this motor rotational speed control corresponds to the load that the motor/generator MG receives from the second clutch CL2; as a result, the CL2 actual torque can be inferred from a motor torque detection value during the motor rotational speed control. Additionally, the "μ slip control" is executed in an EV non-shifting state and when the target drive torque is in a region of a predetermined value or greater (set with a concern for a slip prohibited area due to friction, and etc., or an area in which precision cannot be secured due to low hydraulic pressure). When the target drive torque is a predetermined value or lower, a capacity safety factor with which the second clutch CL2 does not slip is secured. Therefore, immediately after EV shifting and immediately after a mode transition from the HEV mode→the EV mode, the second clutch CL2 is slipped in with a depression of the accelerator from when the target drive torque is a low torque in order to operate the μ slip control.

The integrated controller 10 manages the energy consumption of the entire vehicle and assumes the function of running the vehicle at maximum efficiency; necessary information from a motor rotational speed sensor 12, an accelerator position opening amount sensor 16, a vehicle speed sensor 17, a motor rotational speed sensor 21, and other sensor switches 22 are input thereto directly or via a CAN communication line 11. Additionally, this integrated controller 10 comprises a mode selection unit 10a, an engine start control unit 10b, an engine stop control unit 10c, and an operating point command unit 10d.

The mode selection unit 10a selects a traveling mode searched from the position of an operating point that is determined based on the accelerator position opening amount APO and the vehicle speed VSP, using the EV-HEV selection map illustrated in FIG. 2, as the target traveling mode. An EV→HEV switching line (=engine start line), an HEV→EV switching line (=engine stop line), and an HEV→WSC switching line are set in this EV-HEV selection map. When an operating point (APO, VSP) that exists in the EV region crosses the EV→HEV switching line, the target traveling mode is switched from an "EV mode" to an "HEV mode" in the mode selection unit 10a, and an engine start request is outputted to the engine start control unit 10b. When an operating point (APO, VSP) that exists in the HEV region crosses the HEV→EV switching line, the target traveling mode is switched from the "HEV mode" to the "EV mode" in the mode selection unit 10a, and an engine stop request is outputted to the engine stop control unit 10c. The HEV→EV switching line and the EV→HEV switching line are set with a hysteresis amount as lines that separate the EV region and the HEV region. The EV-HEV selection map may be set based on the accelerator position opening amount APO and the battery SOC. At this time, when the battery SOC becomes equal to or less than a predetermined value while the "EV mode" is selected, an EV→HEV switching line having the "HEV mode" as the target traveling mode is set; when the battery SOC becomes equal to or greater than a predetermined value while the "HEV mode" is selected, an HEV→EV switching line having the "EV mode" as the target traveling mode is set. Furthermore, when the operating point (APO, VSP) crosses the HEV→WSC switching line and enters the WSC region while the "HEV mode" is selected, the target traveling mode is switched from the "HEV mode" to the "WSC mode" in the mode selection unit 10a. The HEV→WSC switching line is set along a first set vehicle speed VSP1, at which the engine Eng maintains an idling rotational speed when the automatic transmission AT is in a predetermined low-gear ratio region.

The engine start control unit 10b engages the first clutch CL1 and slip-engages the second clutch CL2 to perform an engine start control for starting the engine Eng with the motor/generator MG as the starter motor, accompanying an input of an engine start request. An engine start determination process mentioned below is executed at this time.

The engine stop control unit 10c releases the first clutch CL1 and slip-engages the second clutch CL2 to perform an engine stop control for stopping the engine Eng, accompanying an input of an engine stop request.

The operating point command unit 10d calculates an operating point arrival target for the FR hybrid vehicle, based on the input information, such as the accelerator position opening amount APO, the vehicle speed VSP, and the target mode. A target engine torque, a target MG torque, a target MG rotational speed, a target CL1 torque, a target CL2 torque, and a target gear stage are calculated as the operating point arrival target. Then, this operating point command unit 10d outputs a target engine torque command, a target MG torque command, a target MG rotational speed command, a target CL1 torque command, a target CL2 torque command, and a target gear stage command to each of the controllers 1, 2, 5, 7 via the CAN communication line 11.

Schematic Configuration of the Automatic Transmission

Figure 3:
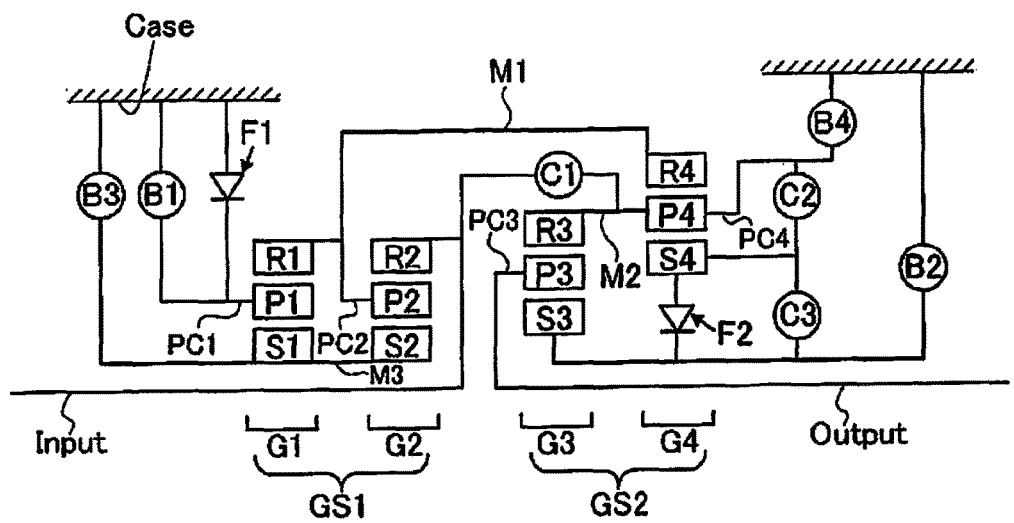
FIG. 3 is a skeleton diagram illustrating one example of an automatic transmission comprising a second clutch of the first embodiment.
Figures 4, 5:
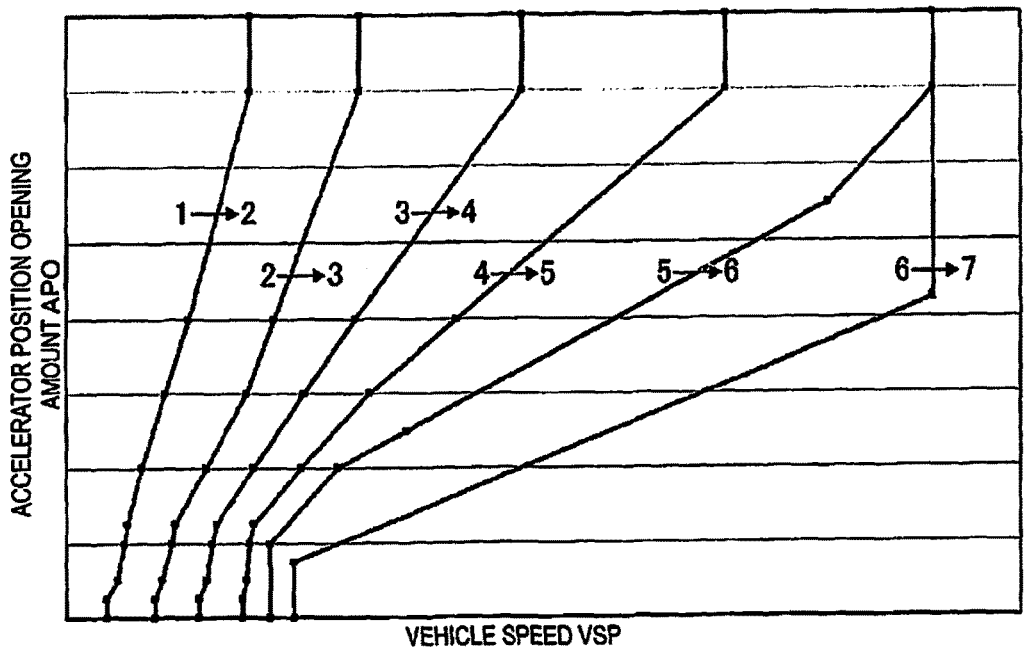
FIG. 4 is an engagement operation table illustrating the engagement state of each frictional engagement element in each gear stage of the automatic transmission of the first embodiment.
FIG. 5 is a diagram illustrating one example of a shifting map of the automatic transmission set in the AT controller in the first embodiment.

FIG. 3 illustrates a skeleton view illustrating one example of an automatic transmission that incorporates a second clutch; FIG. 4 is an engagement operation table illustrating the engagement state of each frictional engagement element in each gear stage of the automatic transmission; and FIG. 5 is a view illustrating one example of a shifting map of the automatic transmission that is set in the AT controller of the first embodiment. The schematic configuration of the automatic transmission AT will be described below based on FIG. 3 to FIG. 5.

The automatic transmission AT is a forward seven gears/reverse one gear stepped automatic transmission; the driving force from at least one of the engine Eng and the motor/generator MG is input from a transmission input shaft Input; and the rotational speed is changed by a shift gear mechanism comprising four planetary gears and seven frictional engagement elements and outputted from the transmission output shaft Output, as illustrated in FIG. 3.

Regarding the shift gear mechanism described above, a first planetary gear set GS1 configured from a first planetary gear G1 and a second planetary gear G2, and a second planetary gear set GS2 configured from a third planetary gear G3 and a fourth planetary gear G4, are arranged coaxially in that order. Additionally, a first clutch C1 (I/C), a second clutch C2 (D/C), a third clutch C3 (H&LR/C), a first brake B1 (Fr/B), a second brake B2 (Low/B), a third brake B3 (2346/B), and a fourth brake B4 (R/B) are arranged as hydraulically actuated frictional engagement elements. Also, a first one way clutch F1 (1st OWC) and a second one way clutch F2 (1&2 OWC) are arranged as mechanically actuated engagement elements.

The first planetary gear G1, second planetary gear G2, third planetary gear G3, and fourth planetary gear G4 are single-pinion type planetary gears, comprising sun gears (S1-S4), ring gears (R1-R4) and carriers (PC1-PC4) that support pinions (P1-P4) that engage with both gears (S1-S4), (R1-R4).

The transmission input shaft Input is coupled to the second ring gear R2, and the rotational driving force from at least one of the engine Eng and the motor/generator MG is input thereto. The transmission output shaft Output is coupled to the third carrier PC3 and transmits the output rotational driving force to the driving wheels (left and right rear wheels RL, RR) via a final gear or the like.

The first ring gear R1, the second carrier PC2, and the fourth ring gear R4 are integrally coupled by a first coupling member M1. The third ring gear R3 and the fourth carrier PC4 are integrally coupled by a second coupling member M2. The first sun gear S1 and the second sun gear S2 are integrally coupled by a third coupling member M3.

FIG. 4 is an engagement operation table; in FIG. 4, the ○ mark indicates that the frictional engagement element is hydraulically engaged in a driving state, the (○) mark indicates that the frictional engagement element is hydraulically engaged in a coasting state (one-way clutch actuation in a driving state), and no marks indicates that the frictional engagement element is in a released state. Additionally, the frictional engagement element in an engaged state indicated by hatching indicates an element that is used as the second clutch CL2 in each gear stage.

Regarding shifting to an adjacent gear stage, gear stages of the forward seven gears and reverse one gear can be realized by a substitution gear change, in which, of the frictional engagement elements described above, one engaged frictional engagement element is released and one released frictional engagement element is engaged, as illustrated in FIG. 4. Furthermore, when the gear stage is in the first gear stage and the second gear stage, the second brake B2 (Low/B) shall be the second clutch CL2. When the gear stage is in the third gear stage, the second clutch C2 (D/C) shall be the second clutch CL2. When the gear stage is in the fourth gear stage and the fifth gear stage, the third clutch C3 (H&LR/C) shall be the second clutch CL2. When the gear stage is in the sixth gear stage and the seventh gear stage, the first clutch C1 (I/C) shall be the second clutch CL2. When the gear stage is in the reverse stage, the fourth brake B4 (R/B) shall be the second clutch CL2.

FIG. 5 is a shifting map; when the operating point on the map specified by the vehicle speed VSP and the accelerator position opening amount APO crosses an upshift line, an upshift command is outputted. For example, when the gear stage is in the first stage and the operating point (VSP, APO) crosses the 1→2 upshift line due to a rise in the vehicle speed VSP, a 1→2 upshift command is outputted. FIG. 5 describes only an upshift line, but, of course, a down shift line is also set with a hysteresis with respect to the upshift line.

Configuration of the Engine Start Determination Process

Figure 6:
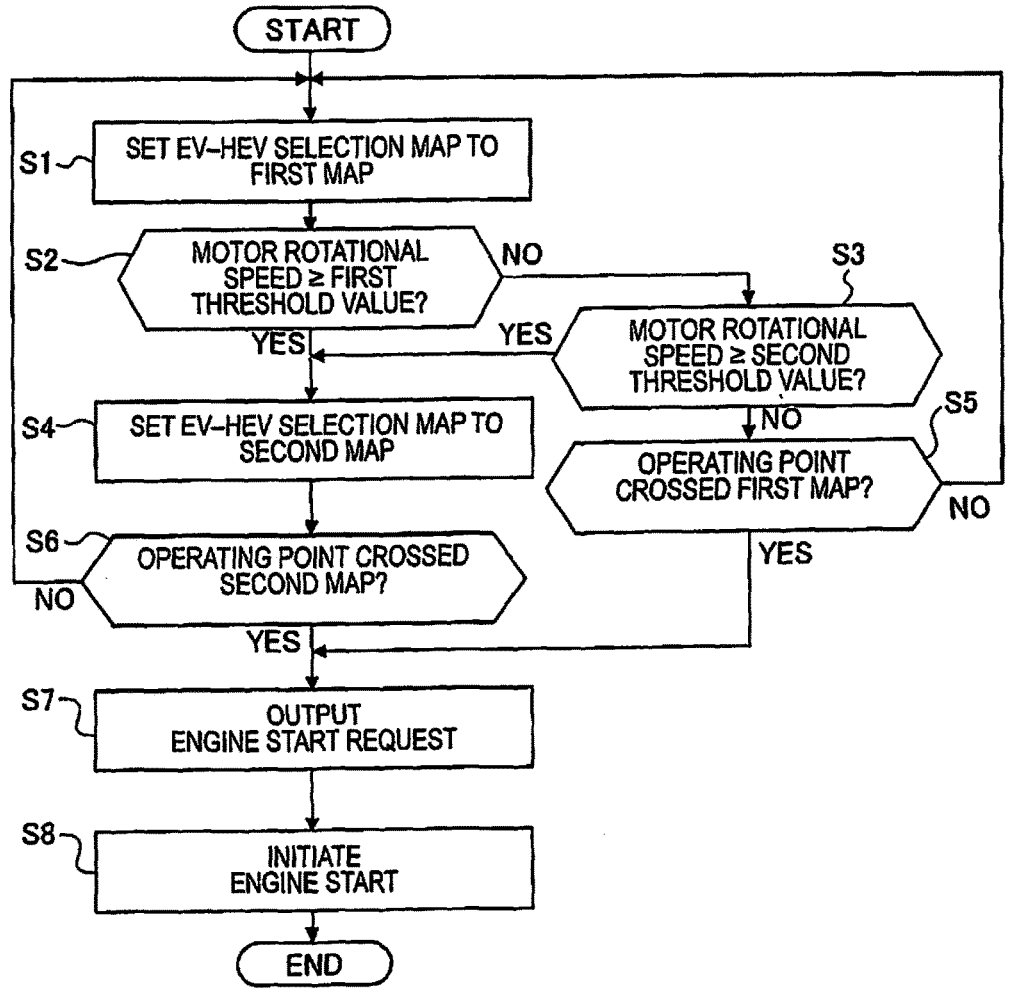
FIG. 6 is a flowchart illustrating the flow of the engine start determination process that is executed in the integrated controller of the first embodiment.
Figure 7:
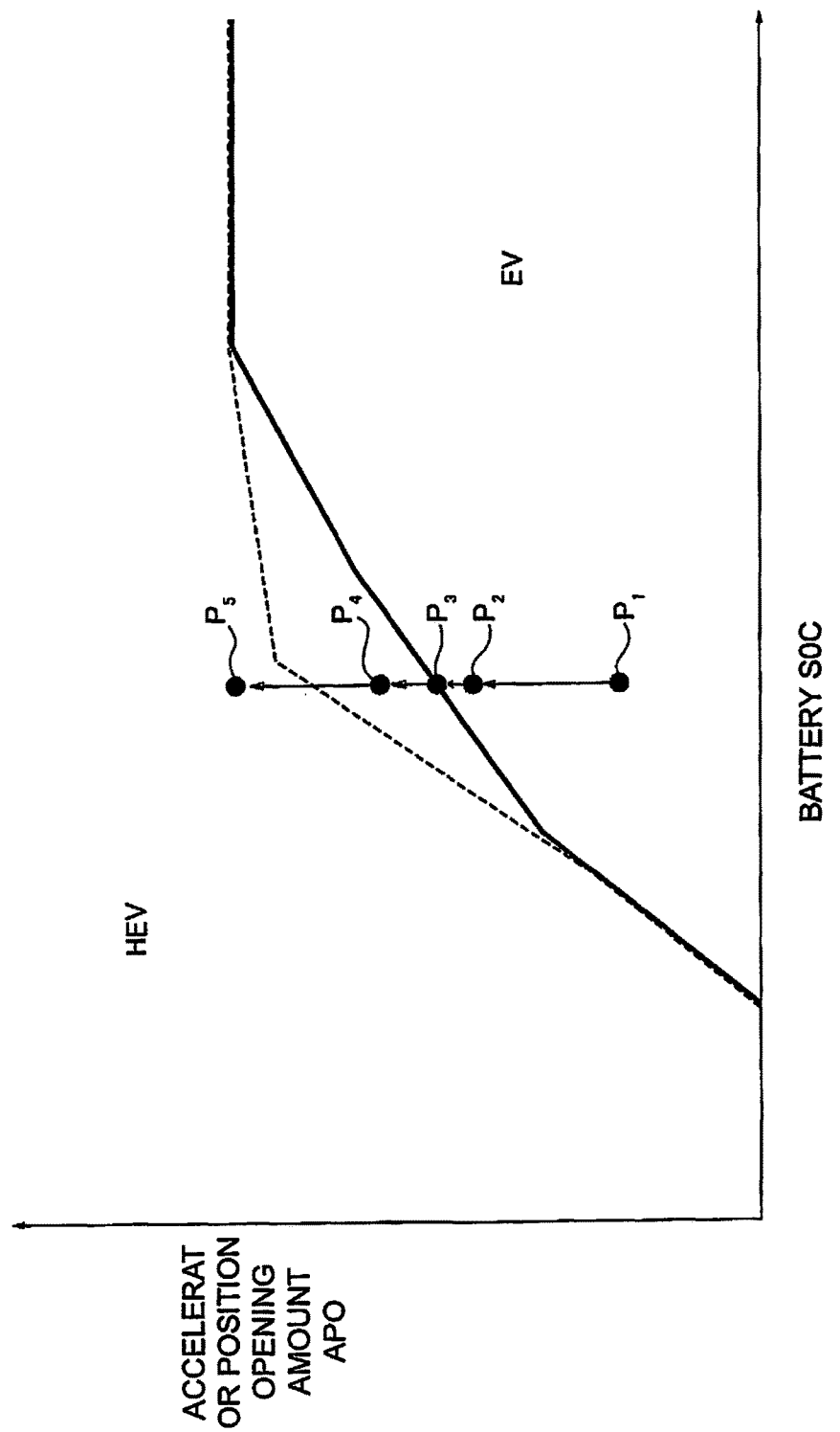
FIG. 7 is a diagram illustrating an EV-HEV selection map that is applied in the engine start determination process of the first embodiment.

FIG. 6 is a flowchart illustrating the flow of the engine start determination process that is executed in the engine start control unit of the first embodiment. FIG. 7 is a view illustrating an EV-HEV selection map that is applied in the engine start determination process of the first embodiment. Each step of the flowchart in FIG. 6 representing the configuration of the engine start determination process is described below. This engine start determination process is executed when the traveling mode is the "EV mode."

In step S1, an EV-HEV selection map that is used upon selecting the target mode in the mode selection unit 10a of the integrated controller 10 is set as a first engine start map. Here, the "engine start map" is a characteristic diagram showing only the EV→HEV switching line, which is the engine start line in the EV-HEV selection map; the "first engine start map" is illustrated by solid lines in FIG. 7. This "first engine start map" is set according to the accelerator position opening amount APO and the battery SOC. The accelerator position opening amount APO is a value that varies proportionally with respect to the required driving force of the driver and is a driver-required driving force equivalent value. In addition, the battery SOC represents the remaining charge of the battery, showing the charging state of the battery. That is, this battery SOC becomes a battery charging state equivalent value.

In step S2, following the setting of the first engine start map in step S1, a determination is made regarding whether or not the output rotational speed of the motor/generator MG (hereinafter referred to as the motor rotational speed) is equal to or greater than a first threshold value (motor rotational speed threshold) that is set in advance. If YES (motor rotational speed≥first threshold value), the process proceeds to step S4. If NO (motor rotational speed<first threshold value), the process proceeds to step S3. Here, the motor rotational speed is detected by a motor rotational speed sensor 12. In addition, the "first threshold value" is set as a value that is obtained by multiplying the rotational speed of the transmission output shaft Output of the automatic transmission AT by the gear ratio of the automatic transmission AT at the target gear stage. Here, a value obtained by adding a predetermined margin to the integrated value of the transmission output rotational speed and the gear ratio is set as the first threshold value.

In step S3, following a determination that the motor rotational speed<the first threshold value in step S2, a determination is made regarding whether or not the motor rotational speed is equal to or greater than a second threshold value (motor rotational speed threshold) that is set in advance. If YES (motor rotational speed≥second threshold value), the process proceeds to step S4. If NO (motor rotational speed<second threshold value), the process proceeds to step S5. The "second threshold value" is a value that is arbitrarily set for each target gear stage of the automatic transmission AT. Here, the second threshold value is set as a value that is obtained by multiplying an arbitrary constant by the inverse of a gear ratio of the automatic transmission AT at the target gear stage and that is set to be a smaller value as the gear stage becomes lower (the gear ratio is larger).

In step S4, following a determination that the motor rotational speed≥the first threshold value in step S2 or a determination that the motor rotational speed≥the second threshold value in step S3, the output rotational speed of the motor/generator MG is considered to be in a relatively high state, and the EV-HEV selection map that is set in step S1 is switched to the second engine start map. Here, the "second engine start map" is a characteristic diagram that is set according to the accelerator position opening amount APO and the battery SOC, as illustrated by broken lines in FIG. 7. In this "second engine start map," a part of the accelerator position opening amount region is set to be a greater value than that in the first engine start map. In addition, a part of the battery SOC region is set to be a smaller value than that in the first engine start map. That is, the engine start condition becomes stricter when starting an engine using this "second engine start map," as compared to when starting an engine using the "first engine start map."

In step S5, following a determination that the motor rotational speed<the second threshold value in step S3, the output rotational speed of the motor/generator MG is considered to be in a relatively low state, and an engine start determination, to which the first engine start map is applied, is performed. That is, a determination is made regarding whether or not an operating point (SOC, APO), which is determined according to the battery SOC and the accelerator position opening amount APO, has crossed the first engine start map, which is set in step S1, to the HEV region side. If YES (has crossed), the process proceeds to step S7. If NO (has not crossed), the process returns to step S1.

In step S6, following the switching of the second engine start map in step S4, an engine start determination, to which the second engine start map is applied, is performed. That is, a determination is made regarding whether or not the operating point (SOC, APO), which is determined according to the accelerator position opening amount APO and the battery SOC, has crossed the second engine start map, which is set in step S4, to the HEV region side. If YES (has crossed), the process proceeds to step S7. If NO (has not crossed), the process returns to step S1.

In step S7, following a determination that the operating point (APO, SOC) has crossed the first engine start map in step S5 or a determination that the operating point (APO, SOC) has crossed the second engine start map in step S6, an engine start request is outputted, and the process proceeds to step S8. The engine start flag is changed from OFF to ON with this engine start request being outputted.

In step S8, following the output of the engine start request in step S7, the engine start control is started, and the process ends.

Here, the engine start control controls the torque transmission capacity of the second clutch CL2 to be the required driving force of the driver while slip-engaging the second clutch CL2 by controlling the rotational speed of the motor/generator MG. Then, the first clutch CL1 is engaged to transmit the torque of the motor/generator MG to the engine Eng in order to crank the engine Eng.

Next, the effects are described. First, the "effect of the engine start in a hybrid vehicle control device of a comparative example" will be described, after which the "effect of the engine start control" in the hybrid vehicle control device of the first embodiment will be described.

Figure 8:
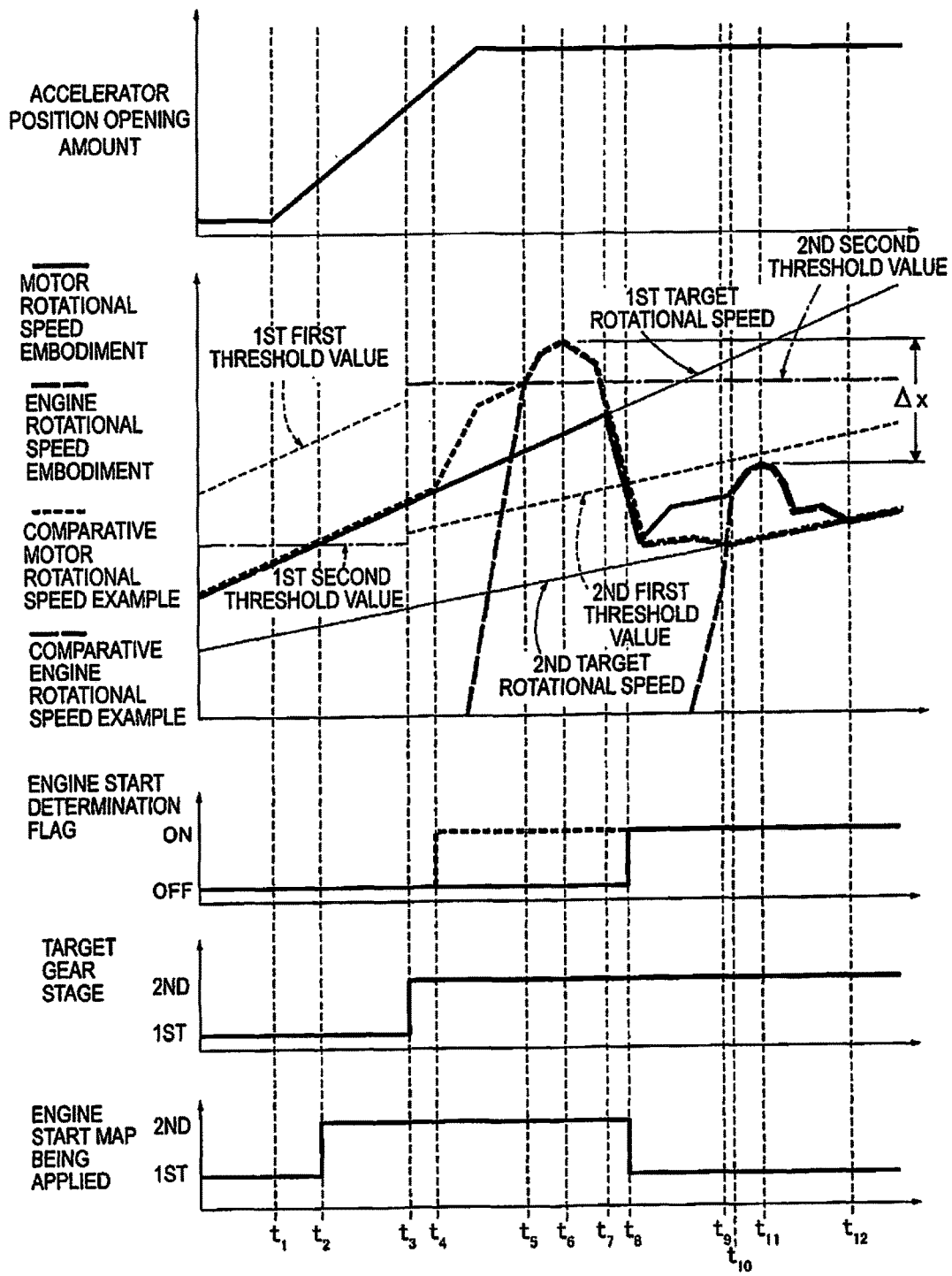
FIG. 8 is a time chart illustrating the respective characteristics of the accelerator position opening amount when starting the engine, the motor rotational speed, the engine rotational speed, the engine start determination flag, the target gear stage, and the engine start map to be applied in the control device of the first embodiment.

Effect of the Engine Start in a Hybrid Vehicle Control Device of a Comparative Example FIG. 8 is a time chart illustrating the respective characteristics of the accelerator position opening amount when starting the engine, the motor rotational speed, the engine rotational speed, the engine start determination flag, the target gear stage, and the engine start map to be applied in the control device of the first embodiment. In FIG. 8, the characteristics of the hybrid control device of the comparative example are shown by the broken lines. The effect of starting the engine in a hybrid vehicle control device of a comparative example will be described based on FIG. 8.

A case will be considered, in which a hybrid vehicle, to which a control device of a comparative example is applied, is traveling in the "EV mode" with the automatic transmission AT in the first gear stage (1st). Here, the control device of the comparative example is that which performs an engine start determination using the first engine start map shown by the solid lines in FIG. 7 at all times.

When the accelerator is depressed at time $t_1$, the accelerator position opening amount APO starts to increase. On the other hand, the output rotational speed of the motor/generator MG (hereinafter referred to as the "motor rotational speed") continues a gradual increase accompanying this depression operation of the accelerator.

At time $t_3$, the operating point (VSP, APO), which is determined according to the vehicle speed VSP and the accelerator position opening amount APO, crosses the 1→2 upshift line on the shifting map illustrated in FIG. 5 due to an increase in the vehicle speed (not shown here), and a 1→2 upshift command is outputted. The target gear stage of the automatic transmission AT is thereby changed from the first gear stage (1st) to the second gear stage (2nd), and the shift control is started.

On the other hand, the accelerator position opening amount APO continues to increase; at time $t_4$, the operating point (SOC, APO), which is determined according to the battery SOC and the accelerator position opening amount APO, crosses the first engine start map shown in FIG. 7 and moves to the HEV region. Accordingly, an engine start request is generated, the engine start flag is changed from OFF to ON, and the engine start control is initiated. The motor rotational speed thereby increases in order to slip-engage the second clutch CL2. In addition, the first clutch CL1 is engaged, the motor torque is transmitted to the engine Eng, and the output rotational speed of the engine Eng (hereinafter referred to as the "engine rotational speed") starts to rise.

When the motor rotational speed and the engine rotational speed match at time $t_5$, the engine cranking is considered to be completed, and the motor rotational speed and the engine rotational speed are increased further to put the engine in a complete combustion state. On the other hand, a shift control based on the 1→2 upshift command that was outputted at time $t_3$ is in progress at this time. Consequently, the motor rotational speed and the engine rotational speed plummet after peaking at time $t_6$. Then, at time $t_9$, the motor rotational speed and the engine rotational speed are made to match the target rotational speed after shifting, and the 1→2 upshift is completed.

In this manner, in the control device of the comparative example, an engine start determination is performed using the first engine start map, regardless of the magnitude of the motor rotational speed. Consequently, an engine start request is outputted in accordance with the state of the operating point (SOC, APO), which is determined according to the battery SOC and the accelerator position opening amount APO, even if the 1→2 upshift has not been completed and the motor rotational speed is in a relatively high state, as described above. Consequently, the engine rotational speed must be increased to match the motor rotational speed at the time of starting the engine, causing the problem that the fuel consumption becomes poor. In addition, since the engine rotational speed is rapidly increased, the hand of the meter that displays the engine rotational speed (tachometer) swings greatly, creating an apparent engine racing state. Consequently, a problem occurs in which discomfort is imparted to the driver due to the hand swinging greatly, even though there is no significant change in the traveling sensation that is felt by the driver.

Then, as described above, in a case in which the 1→2 upshift has been completed after starting the engine, the engine rotational speed becomes a high-speed rotation at the time of starting the engine, then plummeting in order to match the post-shifting rotational speed. Consequently, the so-called frequency variation of the engine sound is increased, and the engine starting sound is increased.

In addition, the motor/generator MG has a characteristic that the motor torque is decreased in a high-speed rotation region. Consequently, if the motor rotational speed is a high-speed rotation, the motor torque that can be utilized for starting the engine will be limited. In this manner, in a traveling situation in which the upper limit value of the torque transmission capacity of the second clutch CL2 is decreased, and, as a result, acceleration takes place accompanying an engine start, there was the risk that the required driving force could not be fully met, causing a driving force interruption or a time lag until the torque is transmitted to the driving wheels.

Effect of the Engine Start Control

A case will be considered, in which a hybrid vehicle, to which a control device of the first embodiment is applied, is traveling in the "EV mode" with the automatic transmission AT in the first gear stage (1st). The effect of the engine start control in a hybrid vehicle control device of the first embodiment will be described based on FIG. 8.

When the accelerator is depressed at time $t_1$, the accelerator position opening amount APO starts to increase while the motor rotational speed continues a gradual increase. At this time, since traveling is performed in the "EV mode," the flowchart illustrated in FIG. 6 is executed, and the first engine start map shown by the solid lines in FIG. 7 is set as the engine start map in step S1. Then, the process proceeds to step S2, and a determination is made regarding whether or not the motor rotational speed is equal to or greater than the first threshold value.

Here, the first threshold value is set as a value obtained by adding a predetermined margin to a value obtained by multiplying the rotational speed of the transmission output shaft Output of the automatic transmission AT by the gear ratio of the automatic transmission AT at the target gear stage. Since the target gear stage is the first gear stage (1st) at time $t_1$, the characteristic diagram thereof becomes that shown by the thin broken lines in FIG. 8. Since the motor rotational speed is below the first threshold value at this time $t_1$, the process proceeds to step S3, and a determination is made regarding whether or not the motor rotational speed is equal to or greater than the second threshold value.

The second threshold value is a value that is set as a value obtained by multiplying an arbitrary constant by the inverse of a gear ratio of the automatic transmission AT at the target gear stage. Since the target gear stage is the first gear stage (1st) at time $t_1$, the characteristic diagram thereof becomes that shown by the thin dashed lines in FIG. 8. Since the motor rotational speed is below the second threshold value at this time $t_1$, the process proceeds to step S5, and an engine start determination is performed by applying the first engine start map. Since the accelerator position opening amount APO is low at this time, the operating point (SOC, APO), which is determined according to the battery SOC and the accelerator position opening amount APO, will be in the $P_1$ position shown in FIG. 7 and remains in the EV region. That is, this operating point (SOC, APO) will not cross the first engine start map. The process thereby returns to step S1, and an engine start request will not be generated.

Thereafter, the motor rotational speed is increased, and the motor rotational speed exceeds the second threshold value at time $t_2$. The process thereby proceeds from step S3→step S4 in the flowchart illustrated in FIG. 6, and the EV-HEV selection map is switched to the second engine start map shown by the broken lines in FIG. 7. The process then proceeds to step S6, and the engine start determination is performed by applying this second engine start map. Since the accelerator position opening amount APO is increased at this time, the operating point (SOC, APO) moves to the $P_2$ position, which is closer to the second engine start map than the position ($P_1$ position) of the operating point (SOC, APO) at time $t_1$. However, since this second engine start map is not crossed, the process returns to step S1, and an engine start request will not be generated.

At time $t_3$, the operating point (VSP, APO), which is determined according to the vehicle speed VSP and the accelerator position opening amount APO, crosses the 1→2 upshift line on the shifting map illustrated in FIG. 5 due to an increase in the vehicle speed (not shown here), and a 1→2 upshift command is outputted. The target gear stage of the automatic transmission AT is thereby changed from the first gear stage (1st) to the second gear stage (2nd), and the shift control is started.

On the other hand, the first threshold value and the second threshold value are changed with the target gear stage being changed from the first gear stage (1st) to the second gear stage (2nd). That is, the first threshold value is set as a value obtained by adding a predetermined margin to a value obtained by multiplying the rotational speed of the transmission output shaft Output of the automatic transmission AT by the gear ratio of the automatic transmission AT at the target gear stage; thus, this has the characteristic diagram illustrated by the thick broken lines in FIG. 8. The second threshold value is a value obtained by multiplying an arbitrary constant by the inverse of a gear ratio of the automatic transmission AT at the target gear stage; thus, this has the characteristic diagram illustrated by the thick dashed lines in FIG. 8.

When the first threshold value and the second threshold value are changed at time $t_3$, the motor rotational speed will exceed the first threshold value at this time $t_3$. Accordingly, the process proceeds from step S2→step S4 in the flowchart illustrated in FIG. 6, and the engine start map is switched to the second engine start map shown by the broken lines in FIG. 7.

Then, the accelerator depression operation continues, and the operating point (SOC, APO) moves to the $P_3$ position to cross the first engine start map at time $t_4$. However, at this time, the EV-HEV selection map is set to the second engine start map shown by the broken lines; as a result, the determination will be NO in step S6, and an engine start request will not be generated. Thereafter, the accelerator depression operation continues, and the operating point (SOC, APO) moves to the $P_4$ position. Again, since the operating point (SOC, APO) does not cross the second engine start map, the determination will be NO in step S6, and an engine start request will not be generated.

The shift control proceeds, and the motor rotational speed control starts to decrease at time $t_7$. When the motor rotational speed becomes equal to or less than the first threshold value at time $t_8$, the process proceeds from step S1→step S2→step S3 in the flowchart illustrated in FIG. 6, and a determination is made regarding whether or not the motor rotational speed is equal to or greater than the second threshold value. In the second gear stage, the second threshold value is a larger value than the first threshold value; therefore, the motor rotational speed threshold is naturally below the second threshold value, and the process proceeds to step S5. At this time, having passed step S1, the EV-HEV selection map is set to the first engine start map. Then, by proceeding to step S5, a determination is made regarding whether or not the operating point (SOC, APO), which is determined according to the battery SOC and the accelerator position opening amount APO, has crossed the first engine start map.

In contrast, the accelerator position opening amount APO has not changed, and the operating point remains in the $P_4$ position at time $t_8$. Accordingly, the operating point (SOC, APO) crosses the first engine start map and exists in the HEV region. The determination is thereby YES in step S5, the process proceeds from step S7→step S8, an engine start request is generated, and the engine start flag is changed from OFF to ON. Then, the engine start control is initiated.

Thereafter, the engine rotational speed is increased, the motor rotational speed and the engine rotational speed match, and the cranking of the engine is completed at time $t_{10}$. The motor rotational speed and the engine rotational speed are thereby increased further to put the engine in a complete combustion state. In addition, a shift control based on the 1→2 upshift command that was outputted at time $t_3$ is in progress at this time. Consequently, the motor rotational speed and the engine rotational speed are decreased after peaking at time $t_{11}$. Then, the 1→2 upshift is completed when the motor rotational speed and the engine rotational speed are made to match the target rotational speed after shifting at time $t_{12}$.

As described above, in the hybrid vehicle control device of the first embodiment, starting the engine is more difficult when the motor rotational speed is relatively high, as compared to when this engine rotational speed is relatively low. Accordingly, the generation of a situation, in which starting the engine start occurs in a state in which the engine rotational speed is high, can be suppressed, and an increase in the engine rotational speed when starting the engine can be suppressed. As a result, an improvement in the fuel consumption of the engine Eng can be achieved. That is, in the control device of the comparative example, the engine rotational speed peaks at time $t_6$ while, in the control device of the first embodiment, the engine rotational speed peaks at time $t_{11}$. At this time, the engine rotational speed peak value in the control device of the first embodiment will be a lower value than the engine rotational speed peak value in the control device of the comparative example, by $\Delta x$. In this manner, since the engine can be started while lowering the peak value of the engine rotational speed, the fuel injection amount can be reduced, and an improvement in fuel consumption can be achieved.

In addition, the amplitude of the hand of the meter that displays the engine rotational speed (tachometer) can be suppressed to remain low by reducing the engine peak value. Accordingly, the generation of an apparent engine racing state can be prevented, and the traveling sensation that is felt by the driver and the meter display will match, preventing discomfort from being imparted to the driver.

Additionally, the engine start control is started at a time at which the motor rotational speed is reduced and the 1→2 upshift is nearly completed; as a result, even if increased at the time of starting the engine, the engine rotational speed will not plummet thereafter in order to match the post-shifting rotational speed. Accordingly, a large change in the so-called frequency variation of the engine sound is suppressed, and an increase in the engine starting sound can be prevented.

Since the engine start control is executed after the motor rotational speed becomes relatively low, starting the engine can occur in a state in which the motor/generator MG has sufficient motor torque. The motor torque that can be utilized to start the engine is thereby less likely to be limited, and starting an engine while responding to the required driving force becomes possible even in a traveling situation in which acceleration takes place accompanying an engine start. As a result, the generation of a driving force interruption or a time lag until the torque is transmitted to the driving wheels can be prevented.

Furthermore, in the control device of the first embodiment, both the first threshold value and the second threshold value are set for each gear stage of the automatic transmission AT with respect to the motor rotational speed. That is, the first threshold value and the second threshold value, which are motor rotational speed threshold values, are each set according to the target transmission ratio of the automatic transmission AT.

Accordingly, if set to be a smaller value when in a lower gear stage, as with the second threshold value of the first embodiment, starting the engine can be made to be difficult to perform when the engine rotational speed is high when in a low gear stage in which the difference in the gear ratio between stages is relatively large. That is, the function of the present invention can only be provided when in certain gear stages. Furthermore, as with the first threshold value of the first embodiment, the motor rotational speed threshold may be set to be a value that is higher than the rotational speed that is predicted to rise at the time of starting the engine by setting this to a value obtained by multiplying the output shaft rotational speed of the automatic transmission AT by the gear ratio of the automatic transmission AT at the target gear stage. The function of the present invention can thereby be providing during shifting, as well as when the motor rotational speed is in a high region.

Furthermore, in the control device of the first embodiment, in order to make starting the engine difficult when the motor rotational speed is relatively high, the integrated controller 10 comprises a first engine start map, which is set according to the accelerator position opening amount APO and the battery SOC, and a second engine start map, in which at least the accelerator position opening amount APO is set to a value that is larger and at least a part of the battery SOC is set to a value that is smaller than those in the first engine start map. When the motor rotational speed is below the first threshold value and the second threshold value, the start determination of the engine Eng is performed using the first engine start map; when the motor rotational speed exceeds one of the first threshold value or the second threshold value, the start determination of the engine Eng is performed using the second engine start map.

Figure 9:
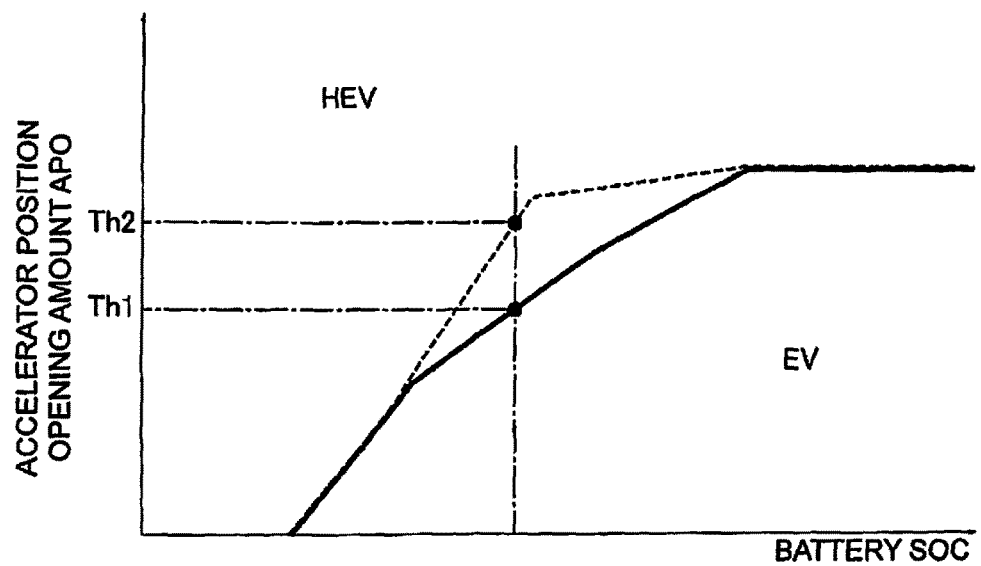
FIG. 9 is an explanatory diagram illustrating the motor rotational speed threshold, based on the accelerator position opening amount, in the control device of the first embodiment.

That is, for example, as illustrated in FIG. 9, if the battery SOC is assumed to be constant, there will be a first engine start threshold th1 on the first engine start map, as well as a second engine start threshold th2 on the second engine start map, which is greater than this first engine start threshold th1. If the motor rotational speed is below the first threshold value and the second threshold value, the engine is started when the accelerator position opening amount APO exceeds the first engine start threshold th1 on the first engine start map. If the motor rotational speed exceeds the first threshold value or the second threshold value, the engine is started when the accelerator position opening amount APO exceeds the second engine start threshold th2 on the second engine start map, which is greater than the first engine start threshold th1.

Figure 10:
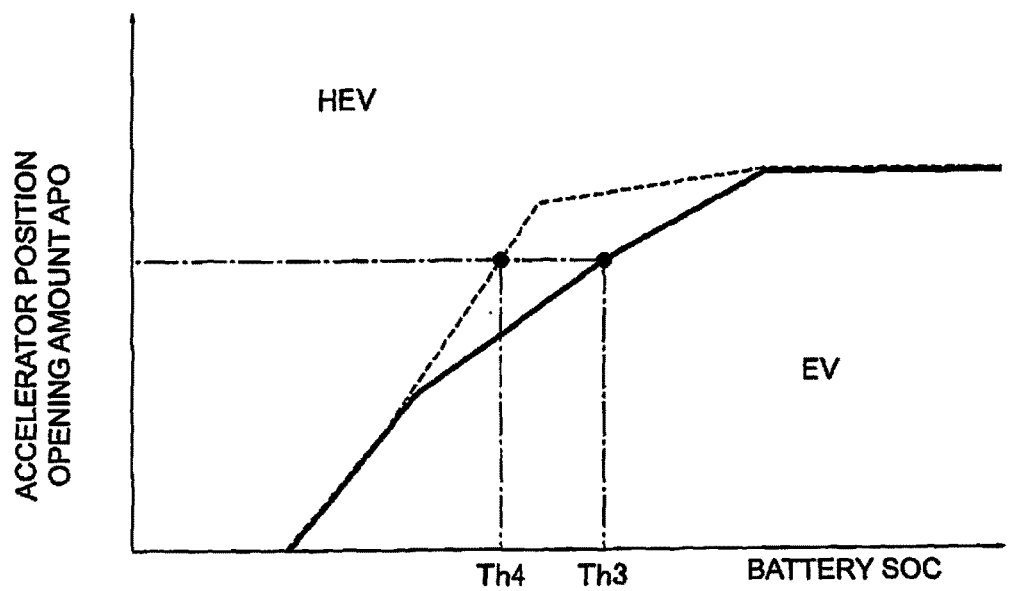
FIG. 10 is an explanatory diagram illustrating the motor rotational speed threshold, based on the battery SOC, in the control device of the first embodiment.

In addition, as illustrated in FIG. 10, if the accelerator position opening amount APO is assumed to be constant, there will be a third engine start threshold th3 on the first engine start map, as well as a fourth engine start threshold th4 on the second engine start map, which is smaller than this third engine start threshold th3. If the motor rotational speed is below the first threshold value and the second threshold value, the engine is started when the battery SOC falls below the third engine start threshold th3 on the first engine start map. If the motor rotational speed exceeds the first threshold value or the second threshold value, the engine is started when the accelerator battery SOC falls below the fourth engine start threshold th4 on the second engine start map, which is smaller than the third engine start threshold th3.

In this manner, starting the engine can be made to be difficult to perform when the motor rotational speed is high via a simple configuration by varying the engine start threshold that is set according to the accelerator position opening amount APO, which is the driver-required driving force equivalent value or by varying the engine start threshold, which is set according to the battery SOC, which is the battery charging state equivalent value, depending on the magnitude of the motor rotational speed. In particular, in the first embodiment, the EV-HEV selection map, which is set according to the accelerator position opening amount APO and the battery SOC, is varied according to the magnitude of the motor rotational speed. Accordingly, the engine start determination can be performed based on both conditions of the required driving force of the driver and the battery charging state, so that the engine start determination can be more appropriately performed.

In the case illustrated in FIG. 8, an example was described in which an engine start request is outputted even if the motor rotational speed is reduced due to a shift control and in which the accelerator position opening amount APO is constant with the EV-HEV selection map being switched from the second engine start map to the first engine start map. However, a situation in which an engine start request is outputted is not limited thereto. For example, even in a case in which the motor rotational speed exceeds the second threshold value and the EV-HEV selection map is set to the second engine start map, if the accelerator position opening amount APO is increased by depressing the accelerator, and the operating point (SOC, APO) moves to the $P_5$ position shown in FIG. 7, this operating point (SOC, APO) crosses the second engine start map and moves to the HEV region. In this case, the motor rotational speed is relatively high; however, since an engine start request is outputted and an engine start control is executed, the driving force required by the driver can be met.

Next, the effects are described. The effects listed below can be obtained with the hybrid vehicle control device according to the first embodiment.

(1A) The invention is mounted on a hybrid vehicle comprising: an engine Eng; a motor (motor/generator) MG provided to a drive system from the engine Eng to the driving wheels (left and right rear wheels) RL, RR for starting the engine Eng and driving the driving wheels RL, RR; and a mode switching mechanism (first clutch) CL1 provided to a connecting portion of the engine Eng and the motor MG, which starts the engine Eng by transmitting torque from the motor MG to the engine Eng when an engine start request has been made while traveling with only the motor MG as the drive source, and comprises an engine start control unit 10b configured to make starting the engine Eng more difficult when the vehicle speed increases accompanying a depression operation of an accelerator, until a decrease in the rotational speed of the motor MG is generated by an upshift that reduces the gear ratio, by making the starting condition of the engine Eng stricter. An increase in the engine rotational speed when starting the engine can thereby be suppressed, and the deterioration of fuel consumption due to starting the engine can be prevented.

(1B) The engine start control unit 10b is configured to make starting the engine more difficult when the rotational speed of the motor MG exceeds a motor rotational speed threshold (first threshold value, second threshold value) that is set in advance, after a reduction in the rotational speed of the motor MG occurs, by making the starting condition of the engine stricter, as compared to when the rotational speed of the motor MG is below the motor rotational speed threshold (first threshold value, second threshold value). An increase in the engine rotational speed when starting the engine can thereby be suppressed, and deterioration of fuel consumption by starting the engine can be prevented.

(2) The engine start control unit 10b is configured to start the engine Eng when the driver-required driving force equivalent value (accelerator position opening amount APO) exceeds a first engine start threshold th1 if the rotational speed of the motor MG is below the motor rotational speed threshold (first threshold value, second threshold value), and to start the engine Eng when the driver-required driving force equivalent value (accelerator position opening amount APO) exceeds a second engine start threshold th2, which is larger than the first engine start threshold th1 if the rotational speed of the motor MG exceeds the motor rotational speed threshold (first threshold value, second threshold value). Starting the engine can thereby be made to be difficult to perform when the motor rotational speed is high via a simple configuration.

(3) The engine start control unit 10b is configured to start the engine Eng when the battery charging state equivalent value (battery SOC) is below a third engine start threshold th3 if the rotational speed of the motor MG is below the motor rotational speed threshold (first threshold value, second threshold value), and to start the engine Eng when the battery charging state equivalent value (battery SOC) falls below a fourth engine start threshold th4, which is smaller than the third engine start threshold th3, if the rotational speed of the motor MG exceeds the motor rotational speed threshold (first threshold value, second threshold value). Starting the engine can thereby be made to be difficult to perform when the motor rotational speed is high via a simple configuration.

(4) The engine start control unit 10b comprises a first engine start map (solid lines) that is set according to a driver-required driving force equivalent value (accelerator position opening amount APO) and a battery charging state equivalent value (battery SOC), and a second engine start map (broken lines) in which at least a part of the driver-required driving force equivalent value (accelerator position opening amount APO) is set to be a value that is greater, and at least a part of the battery charging state equivalent value (battery SOC) is set to be a value that is smaller, than in the first engine start map (solid lines), and is configured to perform a start determination of the engine Eng using the first engine start map (solid lines) when the rotational speed of the motor MG is below the motor rotational speed threshold (first threshold value, second threshold value), and to perform a start determination of the engine Eng using the second engine start map (broken lines) when the rotational speed of the motor MG exceeds the motor rotational speed threshold (first threshold value, second threshold value). Accordingly, the engine start determination can be performed based on both conditions of the driving force required by the driver and the battery charging state, so that the engine start determination can be more appropriately performed.

(5) The hybrid vehicle comprises a transmission (automatic transmission) AT provided to a drive system from the motor MG to the driving wheels RL, RR, wherein the engine start control unit 10b is configured to set the motor rotational speed threshold (second threshold value) according to the target transmission ratio of the transmission AT. Starting the engine can thereby be made to be difficult to perform when the engine rotational speed is high only when traveling at a certain gear stage (gear ratio) in order to efficiently suppress the deterioration of fuel consumption.

(6) The transmission is a stepped automatic transmission (automatic transmission) AT comprising a plurality of gear stages, wherein the engine start control unit 10b is configured to set the motor rotational speed threshold (first threshold value) to a value obtained by multiplying the rotational speed of the output shaft of the stepped automatic transmission AT by the gear ratio of the stepped automatic transmission AT at the target gear stage. Starting the engine can thereby be made to be difficult to perform when the engine rotational speed is high during shifting or when the motor rotational speed is in a high region in order to more efficiently suppress the deterioration of fuel consumption; as a result, an increase in the engine starting sound can be prevented.

The hybrid vehicle control device of the present invention was described above based on the first embodiment, but specific configurations thereof are not limited to this embodiment, and various modifications and additions to the design can be made without departing from the scope of the invention according to each claim in the Claims.

In the first embodiment described above, an example was shown in which the first engine start map and the second engine start map are switched according to the magnitude of the motor rotational speed. However, a configuration to make starting the engine difficult is not limited thereto. For example, a time lag may be provided from when an engine start request is generated until when an engine start control is initiated when the motor rotational speed is relatively high. That is, even when an operating point (SOC, APO), which is determined by the battery SOC and the accelerator position opening amount APO, crosses the engine start map, when the motor rotational speed is relatively high, the engine start control is not immediately started, and the starting time for starting the engine is delayed by a preset time. Starting the engine can thereby be made to be difficult to perform when the motor rotational speed is high in order to suppress a rise in the engine rotational speed and preventing deterioration of fuel consumption becomes possible.

Moreover, the time (time lag) until starting this engine start control may be varied for each gear stage of the automatic transmission AT; for example, a longer time can be set as the gear stage becomes lower. Starting the engine can thereby be made to be difficult to perform when the engine rotational speed is high, only when traveling at a certain gear stage (gear ratio) in order to efficiently suppress the deterioration of fuel consumption.

In addition, in the first embodiment described above, an example was shown in which a motor rotational speed threshold is set for each gear stage of the automatic transmission AT, but the invention is not limited thereto. For example, a motor rotational speed threshold may be set according to the magnitude of the accelerator position opening amount APO, which is the driver-required driving force equivalent value. That is, for example, the motor rotational speed threshold is set to be a relatively high value when the accelerator is greatly depressed and the accelerator position opening amount APO is relatively large. With such a configuration, when the accelerator position opening amount APO is large and the driving force required by the driver is thought to be high, starting the engine start be swiftly performed even if the motor rotational speed is high, and the driving force required by the driver can be met. That is, by setting the motor rotational speed threshold according to the magnitude of the driver-required driving force equivalent value, a deterioration of fuel consumption can be prevented while swiftly meeting the driving force required by the driver.

Furthermore, a time (time lag) may be provided from when an engine start request is generated until when an engine start control is started, according to the magnitude of the accelerator position opening amount APO, which is the driver-required driving force equivalent value. That is, when the accelerator position opening amount APO is large and the required driving force of the driver is thought to be high, the time from when an engine start request is generated until when an engine start control is initiated can be set to be relatively short. Therefore, when the accelerator position opening amount APO is large and the driving force required by the driver is thought to be high, starting the engine can be swiftly performed, and the driving force required by the driver can be met.

Furthermore, in the first embodiment, an example was shown in which both the first engine start map and the second engine start map are switched according to the magnitude of the motor rotational speed, but the present invention is not limited thereto. For example, the invention maybe one having a number of motor rotational speed thresholds and a number of engine start maps to match the motor rotational speed thresholds.

In addition, in the first embodiment, an example was shown in which a first clutch CL1 is used as the mode switching mechanism for switching between the HEV mode and the EV mode. However, the invention is not limited thereto and may be an example that uses a differential device or a power dividing device, which exert a clutch function without using a clutch, such as a planetary gear.

In addition, in the first embodiment, an example was shown in which the shifting element in the automatic transmission AT was diverted as the second clutch CL2, and the element selected from the three engagement elements that are engaged at each gear stage is set as the second clutch CL2. However, the second clutch CL2 may be a clutch that is provided independently of the automatic transmission, such as a clutch that is disposed between the motor and the input shaft of the automatic transmission or a clutch that is disposed between the output shaft of the automatic transmission and the driving wheels. In addition, the automatic transmission AT is not limited to a stepped automatic transmission and may be a continuously variable transmission, a stepped manual (manual) transmission, or a reduction gear.

Additionally, in the first embodiment, an example was shown in which an accelerator position opening amount APO is used as the "driver-required driving force equivalent value," but the invention is not limited thereto; for example, a required drive torque command value or other values that change according to the requirements of the driver may be applied. Furthermore, an example was shown in which a battery SOC is used as the "battery charging state equivalent value," but the invention is not limited thereto; for example, a battery charge/discharge time difference or a value that changes according to the charging state of the battery 4 may be applied.

Furthermore, in the first embodiment, an example was shown in which an engine start map that is used for the engine start determination is set according to the battery SOC and the accelerator position opening amount APO, but the invention is not limited thereto. The engine start map may be set based on the vehicle speed VSP and the accelerator position opening amount APO; or, the engine start map may be set based on one value, such as the accelerator position opening amount APO only, the battery SOC only, or the like.

The invention claimed is:

1. A hybrid vehicle control device comprising:
an engine;
a motor configured to be disposed in a drive system from the engine to a driving wheel for starting the engine and driving the driving wheel;
a mode switching mechanism operatively coupled to a connecting portion of the engine and the motor, which starts the engine by transmitting torque from the motor to the engine upon an engine start request being outputted while traveling with only the motor as a drive source; and
an engine start control unit programmed to make starting the engine more difficult, when a rotational speed of the motor exceeds a predetermined motor rotational speed threshold, upon determining vehicle speed is increasing while a depression operation of an accelerator is occurring, and to set the timing for restoring the strict engine start condition so as not to be strict after the decrease in the rotational speed of the motor has occurred, which is caused by an upshift operation that reduces a gear ratio.

2. The hybrid vehicle control device according to claim 1, wherein
the engine start control unit is further programmed to make starting the engine more difficult upon determining the rotational speed of the motor exceeds a motor rotational speed threshold that is set in advance, after a reduction in the rotational speed of the motor occurs, by making the starting condition of the engine stricter, as compared to when the rotational speed of the motor is below the motor rotational speed threshold.

3. The hybrid vehicle control device according to claim 2, wherein
the engine start control unit is further programmed to
start the engine upon determining a driver-required driving force equivalent value exceeds a first engine start threshold and determining the rotational speed of the motor is also below the motor rotational speed threshold, and
start the engine upon determining the driver-required driving force equivalent value exceeds a second engine start threshold, which is larger than the first engine start threshold, and determining the rotational speed of the motor also exceeds the motor rotational speed threshold.

4. The hybrid vehicle control device according to claim 3, wherein
the engine start control unit is further programmed to
start the engine upon determining a battery charging state equivalent value being below a third engine start threshold, and determining the rotational speed of the motor is also below the motor rotational speed threshold, and
start the engine upon determining the battery charging state equivalent value falling below a fourth engine start threshold, which is smaller than the third engine start threshold, and determining the rotational speed of the motor also exceeds the motor rotational speed threshold.

5. The hybrid vehicle control device according to claim 3, wherein
the engine start control unit comprises
a first engine start map, which is set according to a driver-required driving force equivalent value and a battery charging state equivalent value, and
a second engine start map, in which at least a part of the driver-required driving force equivalent value is set to a value that is greater, and at least a part of the battery charging state equivalent value is set to a value that is smaller, than in the first engine start map, and
the engine start control unit is further programmed to
perform a start determination for the engine using the first engine start map upon determining the rotational speed of the motor is below the motor rotational speed threshold, and
perform a start determination of the engine using the second engine start map upon determining the rotational speed of the motor exceeds the motor rotational speed threshold.

6. The hybrid vehicle control device according to claim 3, further comprising
a transmission disposed in the drive system and operatively coupled to the motor between the motor to the driving wheel,
the engine start control unit is further programmed to set the motor rotational speed threshold according to a target transmission ratio of the transmission.

7. The hybrid vehicle control device according to claim 6, wherein
the transmission is a stepped automatic transmission comprising a plurality of gear stages, and
the engine start control unit is further programmed to set the motor rotational speed threshold to a value obtained by multiplying a rotational speed of an output shaft of the stepped automatic transmission by a gear ratio of the stepped automatic transmission at a target gear stage.

8. The hybrid vehicle control device according to claim 2, wherein
the engine start control unit is further programmed to
start the engine upon determining a battery charging state equivalent value being below a third engine start threshold, and determining the rotational speed of the motor is also below the motor rotational speed threshold, and
start the engine upon determining the battery charging state equivalent value falling below a fourth engine start threshold, which is smaller than the third engine start threshold, and determining the rotational speed of the motor also exceeds the motor rotational speed threshold.

9. The hybrid vehicle control device according to claim 8, wherein
the engine start control unit comprises
a first engine start map, which is set according to a driver-required driving force equivalent value and a battery charging state equivalent value, and
a second engine start map, in which at least a part of the driver-required driving force equivalent value is set to a value that is greater, and at least a part of the battery charging state equivalent value is set to a value that is smaller, than in the first engine start map, and the engine start control unit is further programmed to
perform a start determination for the engine using the first engine start map upon determining the rotational speed of the motor is below the motor rotational speed threshold, and perform a start determination of the engine using the second engine start map upon determining the rotational speed of the motor exceeds the motor rotational speed threshold.

10. The hybrid vehicle control device according to claim 8, further comprising
a transmission disposed in the drive system and operatively coupled to the motor between the motor to the driving wheel,
the engine start control unit is further programmed to set the motor rotational speed threshold according to a target transmission ratio of the transmission.

11. The hybrid vehicle control device according to claim 10, wherein
the transmission is a stepped automatic transmission comprising a plurality of gear stages, and
the engine start control unit is further programmed to set the motor rotational speed threshold to a value obtained by multiplying a rotational speed of an output shaft of the stepped automatic transmission by a gear ratio of the stepped automatic transmission at a target gear stage.

12. The hybrid vehicle control device according to claim 2, wherein
the engine start control unit comprises
a first engine start map, which is set according to a driver-required driving force equivalent value and a battery charging state equivalent value, and
a second engine start map, in which at least a part of the driver-required driving force equivalent value is set to a value that is greater, and at least a part of the battery charging state equivalent value is set to a value that is smaller, than in the first engine start map, and
the engine start control unit is further programmed to
perform a start determination for the engine using the first engine start map upon determining the rotational speed of the motor is below the motor rotational speed threshold, and
perform a start determination of the engine using the second engine start map upon determining the rotational speed of the motor exceeds the motor rotational speed threshold.

13. The hybrid vehicle control device according to claim 12, further comprising
a transmission disposed in the drive system and operatively coupled to the motor between the motor to the driving wheel,
the engine start control unit is further programmed to set the motor rotational speed threshold according to a target transmission ratio of the transmission.

14. The hybrid vehicle control device according to claim 13, wherein
the transmission is a stepped automatic transmission comprising a plurality of gear stages, and
the engine start control unit is further programmed to set the motor rotational speed threshold to a value obtained by multiplying a rotational speed of an output shaft of the stepped automatic transmission by a gear ratio of the stepped automatic transmission at a target gear stage.

15. The hybrid vehicle control device according to claim 2, further comprising
a transmission disposed in the drive system and operatively coupled to the motor between the motor to the driving wheel,
the engine start control unit is further programmed to set the motor rotational speed threshold according to a target transmission ratio of the transmission.

16. The hybrid vehicle control device according to claim 15, wherein
the transmission is a stepped automatic transmission comprising a plurality of gear stages, and
the engine start control unit is further programmed to set the motor rotational speed threshold to a value obtained by multiplying a rotational speed of an output shaft of the stepped automatic transmission by a gear ratio of the stepped automatic transmission at a target gear stage.

* * * * *